United States Patent [19]
Fridinger et al.

[11] 3,864,397
[45] Feb. 4, 1975

[54] 2,6-DIHALOBENZALDEHYDE SULFONYL HYDRAZONES

[75] Inventors: Tomas L. Fridinger; Edward L. Mutsch, both of Woodbury Twsp., Washington City; David R. Pauly, Stillwater, all of Minn.

[73] Assignee: Minnesota Mining and Manufacturing Company, St. Paul, Minn.

[22] Filed: Oct. 16, 1972

[21] Appl. No.: 297,970

Related U.S. Application Data

[62] Division of Ser. No. 90,074, Nov. 16, 1970, Pat. No. 3,709,936.

[52] U.S. Cl. .......................................... 260/556 H
[51] Int. Cl. ................... C07c 143/74, C07c 143/78
[58] Field of Search ................................. 260/556 H

[56] References Cited
UNITED STATES PATENTS

| | | | |
|---|---|---|---|
| 2,962,511 | 11/1960 | Zimmer | 260/397.7 R |
| 3,129,257 | 4/1964 | Paquette | 260/556 H |

FOREIGN PATENTS OR APPLICATIONS

| | | | |
|---|---|---|---|
| 538,462 | 11/1955 | Belgium | 260/556 H |

*Primary Examiner*—Henry R. Jiles
*Assistant Examiner*—S. D. Winters
*Attorney, Agent, or Firm*—Alexander, Sell, Steldt & DeLaHunt

[57] ABSTRACT

The substitution of semicarbazones of 2',6'-dihalobenzaldehydes by 1-alkyl groups and 3-alkylsulfonyl or 3-arylsulfonyl groups, provides compounds which are active plant growth regulators. Plant growth regulation provides a more efficient means of growing food-producing plants and the like.

7 Claims, No Drawings

2,6-DIHALOBENZALDEHYDE SULFONYL HYDRAZONES

This is a division of application Ser. No. 90,074, filed Nov. 16, 1970, now U.S. Pat. No. 3,709,936.

BACKGROUND OF THE INVENTION

The compounds of the present invention are substituted semicarbazones of certain benzaldehydes. More specifically they are semicarbazones of 2',6'-dihalobenzaldehydes substituted by 1-alkyl groups and 3-alkylsulfonyl or 3-arylsulfonyl groups. The compounds of the present invention are useful as plant growth regulators and may be used with other various suitable adjuvants, both inert and active.

The problem of population explosion and food shortage have become quite serious recently and are widely acknowledged. The search for methods to improve the efficiency of agricultural production continues vigorously and in many ways. Equipment, improved varieties of plants and chemical control of plant pests continue to advance in sophistication. Plant growth regulating chemicals have the potential to play an important role in the struggle against hunger. Such chemicals may be compared to hormones and other food supplements to the human diet as they help the plant to do a more efficient job in its production of food.

Plant growth regulating utility is relatively uncommon, although widely sought. In some cases chemical compounds may be plant growth regulators at low concentrations and may be very phytotoxic, that is herbicidal, at high concentrations. An example of this is 2,4-dichlorophenoxyacetic acid. In fact, the term "plant growth regulator" is sometimes used to include herbicidal properties, although it is not used herein in that sense. Plant growth regulators may stimulate or retard growth of the plant or may affect the growth of one particular part of the plant without affecting other parts of the plant. In some cases, plant growth regulators may be found which direct the energy of the plant to a particular aspect of its development which is most desirable, that is they may increase the yield of the edible portion of the plant. This may occur by a variety of mechanisms, for example increased flowering, increased bud set, enlargement of the edible portion and the like. Such effects are particularly advantageous.

The methods for distribution of agricultural chemicals in general, and plant growth regulators in particular, utilize the scattering of a relatively small amount of diluted material over a large area. Examples of regulators so used are maleic hydrazide and gibberillic acid. Accidental localization of the effective ingredient can occur, however, resulting in phytotoxicity if the ingredient is herbicidal at higher concentrations. For this reason plant growth regulators with very low phytotoxicity would be desirable.

SUMMARY OF THE INVENTION

According to the present invention there are provided compounds of the formula

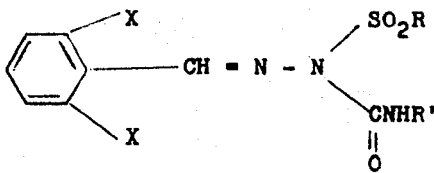

wherein X is halogen; R is alkyl and haloalkyl having from one to four carbon atoms, phenyl and substituted phenyl; and R' is alkyl having from one to four carbon atoms. The compounds find use as plant growth regulators and have the advantage of little or no phytotoxicity.

In the preferred embodiment of the present invention, X is chlorine or bromine, although it may also be fluorine or iodine. Preferably, one X is always chlorine. In the most preferred embodiment, both X's are chlorine as the corresponding starting materials are most readily available.

R' may be a straight or branched chain alkyl of one to four carbon atoms, but is preferably methyl or ethyl, methyl being preferred. R may be straight or branched chain alkyl of one to four carbon atoms, but it is preferably methyl or ethyl, methyl being preferred.

When R is haloalkyl having from one to four carbon atoms, the halogen may be fluorine, chlorine or bromine, but is preferably fluorine or chlorine. In the preferred embodiment, R is generally one or two carbon atoms partially halogenated. Most preferred are compounds wherein R is chloromethyl or fluoromethyl.

When R is substituted phenyl, one to five substituents may be present on the ring. These substituents may be the same or different. Substituents which may be present include halogen, alkoxy, alkyl, nitro and haloalkyl. Presently preferred substituents are halogen and alkoxy.

The compounds of the invention are prepared, generally, by the reaction of novel 2,6-dihalobenzaldehyde alkyl-, haloalkyl- and arylsulfonyl hydrazones with alkyl isocyanates. This reaction is preferably carried out in a suitable nonreactive solvent which dissolves the hydrazone, for example ketones such as acetone, esters such as ethyl acetate, halogenated hydrocarbons such as dichloromethane, and the like. An excess of the isocyanate is generally used to facilitate the reaction. The reaction may be run at room temperature, but generally requires higher temperatures, such as the reflux temperature of the solvent, and may require extended refluxing for two to three days although refluxing for 1 to 48 hours has been found sufficient for most applications. Preferably, the reaction is run in the presence of a suitable catalyst such as a tertiary amine of which triethylamine is most preferred.

Because the reaction is sluggish, it may be necessary to separate the product from unreacted starting material by fractional crystallization, selective extraction or elution chromatography. The products obtained are generally solids. The synthetic reaction is illustrated by the following equation:

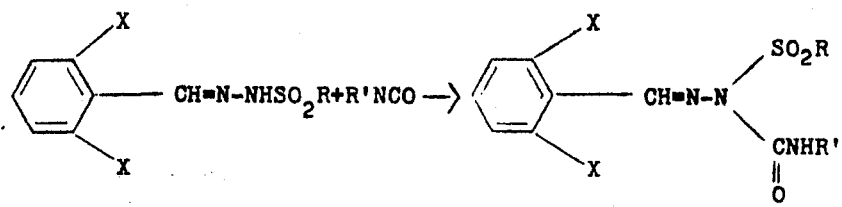

The alkyl isocyanates useful in the process of the above equation are well known in the art. The novel hydrazone intermediates are prepared by the reaction of a 2,6-dihalobenzaldehyde with an alkylsulfonyl, haloalkylsulfonyl or arylsulfonyl hydrazine. Some 2,6-dihalobenzaldehydes are readily available and some others are reported in the chemical literature. See, for example, G. Lock, Berichte, Vol. 68, page 1505 (1935); J. F. Bunnett, et al, J.A.C.S., Vol. 83, page 2512 (1961); and British Pat. No. 1,080,167, issued Aug. 23, 1967. All of the 2,6-dihalobenzaldehydes are available through the use of the synthetic techniques reported for the preparation of such compounds. Some of the alkyl and aryl sulfonylhydrazides are known in the art, and all of the hydrazides may be prepared by known synthetic methods such as reaction of the sulfonyl halides with hydrazine. The novel haloalkylsulfonyl hydrazides disclosed herein are not reported in the literature.

The novel hydrazone intermediates of the invention are prepared according to the following reaction:

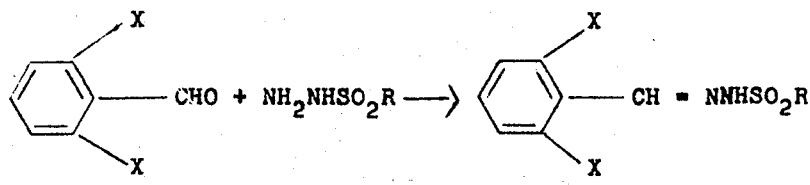

The hydrazide is first reacted with the benzaldehyde. The mixture is then dissolved in refluxing ethanol and the reaction is heated at reflux temperature (approximately 80°C.) for one to several hours to insure the completion of the reaction. The product generally is obtained as a solid precipitate upon cooling of the reaction mixture.

The plant growth regulating activity of the compounds of the invention was observed by known screening tests on several plant species. The plants were sprayed to run-off with a solution of the novel compounds of the invention in acetone with a surfactant such as "Tronic" which is a mixture of alkyl aryl oxyethylene glycols mixed petrolium distillates, alkyl sulfates and alkyl amine acetates manufactured by Colliodal Products Co. The concentration of the chemical is 2,000 parts per million and the surfactant concentration is 0.25 to 1.0 percent. The plants were checked daily for any effect or alteration on the development of the plant compared to untreated controls. The compounds of the invention were found to be active in producing plant growth regulatory effects. In particular, bean plants (Pinto beans) were found to undergo dwarfing of the plant with increased bud and bean production. Such regulation was noted after two to three weeks. Such an effect is extremely desirable, suggesting that more plants could be planted in a given area while each plant produces more beans.

Among the most active of the compounds were the following:

2',6'-dichlorobenzaldehyde 1-methyl-3-(methanesulfonyl)semicarbazone

2',6'-dichlorobenzaldehyde 1-ethyl-3-(methanesulfonyl)semicarbazone

2',6'-dichlorobenzaldehyde 1-methyl-3-(ethanesulfonyl)semicarbazone

2',6'-dichlorobenzaldehyde 1-methyl-3-(4-bromobenzenesulfonyl)semicarbazone

2',6'-dichlorobenzaldehyde-1-methyl-3-(benzenesulfonyl)semicarbazone

2',6'-dichlorobenzaldehyde 1-methyl-3-(4-methoxybenzenesulfonyl)semicarbazone

The following non-limiting examples are given to illustrate the invention more specifically, particularly with respect to the preparation of the novel intermediates and novel and valuable compounds of the present invention.

EXAMPLE 1

To a stirred mixture of 7.3 gm of 4-bromobenzenesulfonylhydrazide (0.029 mole) in 50 ml. of water is added to a solution of 5 gm. of 2,6-dichlorobenzaldehyde (0.0286 mole) in 50 ml. of ethanol in one batch. A solid precipitates and 500 ml. of ethanol is added. The mixture is heated to reflux and maintained at reflux temperature for one hour. The solution is then filtered hot and allowed to cool slowly. The precipitate is collected by filtration and washed three times with 75 ml. of water. The white solid is 2,6-dichlorobenzaldehyde 4-bromobenzenesulfonyl hydrazone, m.p. 181°–183°C.

| Analysis: | %C | %H | %N |
|---|---|---|---|
| Calculated for $C_{13}H_9BrCl_2N_2O_2S$: | 38.3 | 2.2 | 6.9 |
| Found: | 38.5 | 2.1 | 6.9 |

Other 2,6-dihalobenzaldehyde arylsulfonyl hydrazones which are prepared according to the method of Example 1 are given in the following table.

TABLE I

| Ex. No. | Compound | Melting Point (in °C.) |
|---|---|---|
| 2 | 2,6-dichlorobenzaldehyde benzenesulfonyl hydrazone | 125–130 |
| 3 | 2,6-dichlorobenzaldehyde 4-methylbenzenesulfonyl hydrazone | 189–193 |
| 4 | 2,6-dichlorobenzaldehyde 4-nitrobenzenesulfonyl hydrazone | 193–197 |
| 5 | 2,6-dichlorobenzaldehyde 4-methoxybenzenesulfonyl hydrazone | 145.5–149.5 |
| 6 | 2,6-dichlorobenzaldehyde 4-fluorobenzenesulfonyl hydrazone | 179–181 |

TABLE I — Continued

| Ex. No. | Compound | Melting Point (in °C.) |
| --- | --- | --- |
| 7 | 2,6-dichlorobenzaldehyde 2,4,5-trichlorobenzenesulfonyl hydrazone | 206–209 |
| 8 | 2,6-dichlorobenzaldehyde 3-nitrobenzenesulfonyl hydrazone | 162–167 |
| 9 | 2,6-dichlorobenzaldehyde 2-nitrobenzenesulfonyl hydrazone | — |
| 10 | 2,6-dichlorobenzaldehyde 3,4-dichlorobenzenesulfonyl hydrazone | 188.5–191 |
| 11 | 2,6-dichlorobenzaldehyde 2,5-dichlorobenzenesulfonyl hydrazone | 203–208 |
| 12 | 2,6-dichlorobenzaldehyde 4-chloro-2-nitrobenzenesulfonyl hydrazone | — |
| 13 | 2,6-dichlorobenzaldehyde pentafluorobenzenesulfonyl hydrazone | — |
| 14 | 2,6-dichlorobenzaldehyde 4-chloro-3-nitrobenzenesulfonyl hydrazone | 196–197 |
| 15 | 2,6-dichlorobenzaldehyde 2,3,4-trichlorobenzenesulfonyl hydrazone | 157–159 |
| 16 | 2,6-dichlorobenzaldehyde 4-trifluoromethylbenzenesulfonyl hydrazone | — |

EXAMPLE 17

To a stirred solution of 7.7 gm. of methanesulfonylhydrazide (0.07 mole) in 75 ml. of water is added a solution of 12 gm. of 2,6-dichlorobenzaldehyde (0.069 mole) in 100 ml. of ethanol in one batch. A solid precipitates after which 300 ml. of ethanol is added. The solution is heated to reflux temperature and maintained at reflux for one hour. The mixture is filtered hot and allowed to cool slowly. The precipitate is collected by filtration and washed thoroughly with water. The white solid is 2,6-dichlorobenzaldehyde methanesulfonyl hydrazone, m.p. 175°–182°C.

| Analysis: | %C | %H | %N |
| --- | --- | --- | --- |
| Calculated for $C_8H_8Cl_2N_2O_2S$: | 36.0 | 3.0 | 10.5 |
| Found: | 36.0 | 3.0 | 10.6 |

Other 2,6-dihalobenzaldehyde alkylsulfonyl and haloalkylsulfonyl hydrazones which are prepared according to the method of Example 17 are given in the following table.

TABLE II

| Ex. No. | Compound | Melting Point (in °C) |
| --- | --- | --- |
| 18 | 2,6-dichlorobenzaldehyde ethanesulfonyl hydrazone | 158–163 |
| 19 | 2,6-dichlorobenzaldehyde butanesulfonyl hydrazone | 96–99 |
| 20 | 2,6-dichlorobenzaldehyde fluoromethanesulfonyl hydrazone | 132–135 |
| 21 | 2,6-dichlorobenzaldehyde chloromethanesulfonyl hydrazone | 127–128 |

EXAMPLE 22

To a cold stirred solution of 9.0 gm. of 2,6-dichlorobenzaldehyde methanesulfonyl hydrazone (0.034 mole) in 100 ml. of acetone and 4 drops of triethylamine is added, dropwise, 4 gm. of methyl isocyanate (0.07 mole) in 30 ml. of acetone. The mixture is stirred at room temperature for about 65 hours, then heated to reflux and maintained at a reflux temperature for one hour. The solvent is removed by evaporation in vacuo to give an oil which crystallizes. The solid is recrystallized twice from a hexane chloroform mixture to give white solid 2',6'-dichlorobenzaldehyde 1-methyl-3-(methanesulfonyl)semicarbazone, m.p. 109°–114°C.

| Analysis: | %C | %H | %N |
| --- | --- | --- | --- |
| Calculated for $C_{10}H_{11}Cl_2N_3O_3S$: | 37.1 | 3.4 | 13.0 |
| Found: | 37.0 | 3.4 | 13.0 |

EXAMPLE 23

Ethyl isocyanate is reacted with 2,6-dichlorobenzaldehyde methanesulfonyl hydrazone according to Example 22 to prepare a white solid, 2',6'-dichlorobenzaldehyde 1-ethyl-3-(methanesulfonyl)-semicarbazone, m.p. 114–120°C.

| Analysis: | %C | %H | %N |
| --- | --- | --- | --- |
| Calculated for $C_{11}H_{13}Cl_2N_3O_3S$: | 39.1 | 3.8 | 12.4 |
| Found: | 39.0 | 4.0 | 12.6 |

EXAMPLE 24

Methyl isocyanate is reacted with 2,6-dichlorobenzaldehyde ethanesulfonyl hydrazone according to Example 22 to prepare 2',6'-dichlorobenzaldehyde 1-methyl-3-(ethanesulfonyl)-semicarbazone, semicarbazone, a white solid, m.p. 103°–112°C.

| Analysis: | %C | %H | %N |
| --- | --- | --- | --- |
| Calculated for $C_{11}H_{13}Cl_2N_3O_3S$: | 39.1 | 3.9 | 12.4 |
| Found: | 38.9 | 4.1 | 12.5 |

EXAMPLE 25

To a cold stirred solution of 8.8 gm. of 2,6-dichlorobenzaldehyde 4-bromobenzenesulfonyl hydrazone (0.022 mole) in 90 ml. of acetone and 4 drops of triethylamine is added, dropwise, 2.3 gm. of methyl isocyanate (0.04 mole) in 20 ml. of acetone. The mixture is stirred cold for two hours, then at room temperature for about sixteen hours, and finally it is heated to reflux and maintained at reflux temperature for one hour. The solvent is removed by evaporation in vacuo to give a solid which is recrystallized from a hexane-chloroform mixture. The first crop of precipitate is separated and is found to be starting material. The filtrate is partially evaporated and a second crop is collected which is found to be starting material. Further evaporation of the filtrate gives a third crop which is found to be different from starting material according to its infrared spectrum. When this third crop is again recrystallized from a hexane-chloroform mixture, the white solid product is 2',6'-dichlorobenzaldehyde 1-methyl-3-(4-bromobenzenesulfonyl)semicarbazone, m.p. 121°–125°C.

| Analysis: | %C | %H |
|---|---|---|
| Calculated for $C_{15}H_{12}BrCl_2N_3O_3S$: | 38.7 | 2.6 |
| Found: | 38.7 | 2.7 |

EXAMPLE 26

Methyl isocyanate is reacted with 2,6-dichlorobenzaldehyde benzensulfonyl hydrazone according to Example 25 to prepare 2',6'-dichlorobenzaldehyde-1-methyl-3-(benzenesulfonyl)-semicarbazone, a white solid, m.p. 109°–115°C.

| Analysis: | %C | %H | %N |
|---|---|---|---|
| Calculated for $C_{15}H_{13}Cl_2N_3O_3S$: | 46.6 | 3.4 | 10.9 |
| Found: | 46.6 | 3.5 | 10.9 |

EXAMPLE 27

Methyl isocyanate is reacted with 2,6-dichlorobenzaldehyde 4-methyoxybenzenesulfonyl hydrazone according to Example 25 to prepare 2',6'-dichlorobenzaldehyde 1-methyl-3-(4-methoxybenzenesulfonyl)semicarbazone, a white solid, m.p. 143°–147°C.

| Analysis: | %C | %H | %N |
|---|---|---|---|
| Calculated for $C_{16}H_{15}Cl_2N_3O_4S$: | 46.1 | 3.6 | 10.1 |
| Found: | 46.0 | 3.7 | 10.0 |

Other compounds of the invention obtained from the reaction of an isocyanate with a 2,6-dihalobenzaldehyde alkylsulfonyl or arylsulfonyl hydrazone are shown in the following table:

TABLE III

| Example Number | REACTANTS Isocyanate | Hydrazone | Product |
|---|---|---|---|
| 28 | methyl | 2-chloro-6-fluorobenzaldehyde methanesulfonyl | 2-chloro-6-fluorobenzaldehyde 1-methyl-3-(methanesulfonyl)-semicarbazone |
| 29 | ethyl | 2,6-dichlorobenzaldehyde 4-nitrobenzenesulfonyl | 2,6-dichlorobenzaldehyde 1-ethyl-3-(4-nitrobenzenesulfonyl)semicarbazone |
| 30 | n-butyl | 2,6-dibromobenzaldehyde 4-bromobenzenesulfonyl | 2,6-dibromobenzaldehyde 1-n-butyl-3-(4-bromobenzenesulfonyl)semicarbazone |
| 31 | isopropyl | 2,6-dichlorobenzaldehyde 4-methoxybenzenesulfonyl | 2,6-dichlorobenzaldehyde 1-isopropyl-3-(4-methoxybenzenesulfonyl)semicarbazone |
| 32 | methyl | 2,6-dichlorobenzaldehyde isopropanesulfonyl | 2,6-dichlorobenzaldehyde 1-methyl-3-(isopropanesulfonyl)semicarbazone |
| 33 | methyl | 2,6-diiodobenzaldehyde methanesulfonyl | 2,6-diiodobenzaldehyde 1-methyl-3-(methanesulfonyl)semicarbazone |
| 34 | methyl | 2-chloro-6-bromobenzaldehyde methanesulfonyl | 2-chloro-6-bromobenzaldehyde-1-methyl-3-(methanesulfonyl)semicarbazone |
| 35 | methyl | 2,6-dichlorobenzaldehyde 4-trifluoromethylbenzenesulfonyl | 2,6-dichlorobenzaldehyde 1-methyl-3-(4-trifluoromethylbenzenesulfonyl)-semicarbazone |
| 36 | methyl | 2,6-dichlorobenzaldehyde 4-fluorobenzenesulfonyl | 2,6-dichlorobenzaldehyde 1-methyl-3-(4-fluorobenzenesulfonyl)semicarbazone |
| 37 | methyl | 2,6-dichlorobenzaldehyde 3,4-dichlorobenzenesulfonyl | 2,6-dichlorobenzaldehyde 1-methyl-3-(3,4-dichlorobenzenesulfonyl)semicarbazone |
| 38 | methyl | 2,6-dichlorobenzaldehyde n-butanesulfonyl | 2,6-dichlorobenzaldehyde 1-methyl-3-(n-butanesulfonyl)semicarbazone |
| 39 | methyl | 2,6-dichlorobenzaldehyde pentafluorobenzenesulfonyl | 2,6-dichlorobenzaldehyde 1-methyl-3-(pentafluorobenzenesulfonyl)semicarbazone |
| 40 | methyl | 2,6-dichlorobenzaldehyde 4-methylbenzenesulfonyl | 2,6-dichlorobenzaldehyde 1-methyl-3-(4-methylbenzenesulfonyl)semicarbazone |

TABLE III — Continued

| Example Number | REACTANTS Isocyanate | Hydrazone | Product |
|---|---|---|---|
| 41 | methyl | 2,6-dichlorobenzaldehyde chloromethanesulfonyl | 2,6-dichlorobenzaldehyde 1-methyl-3-(chloromethanesulfonyl)semicarbazone |
| 42 | methyl | 2,6-dichlorobenzaldehyde fluoromethanesulfonyl | 2,6-dichlorobenzaldehyde 1-methyl-3-(fluoromethanesulfonyl)semicarbazone |
| 43 | methyl | 2,6-dichlorobenzaldehyde 2,5-dichlorobenzenesulfonyl | 2,6-dichlorobenzaldehyde 1-methyl-3-(2,5-dichlorobenzenesulfonyl)semicarbazone |
| 44 | methyl | 2,6-dichlorobenzaldehyde 4-nitrobenzenesulfonyl | 2,6-dichlorobenzaldehyde 1-methyl-3-(4-nitrobenzenesulfonyl)semicarbazone |
| 45 | methyl | 2,6-dichlorobenzaldehyde 3-nitrobenzenesulfonyl | 2,6-dichlorobenzaldehyde 1-methyl-3-(3-nitrobenzenesulfonyl)semicarbazone |
| 46 | methyl | 2,6-dichlorobenzaldehyde 2,4,6-trimethylbenzenesulfonyl | 2,6-dichlorobenzaldehyde 1-methyl-3-(2,4,6-trimethylbenzenesulfonyl)semicarbazone |

What is claimed is:

1. A compound having the formula

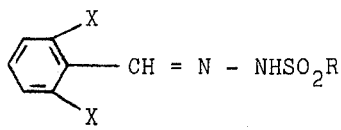

wherein X is halogen and R can be alkyl and haloalkyl having from 1 to 4 carbon atoms, phenyl and substituted phenyl wherein the phenyl substituents are selected from the group consisting of halogen, nitro and alkoxy, alkyl and haloalkyl having from 1 to 4 carbon atoms.

2. The compound 2,6-dichlorobenzaldehyde 4-bromobenzene sulfonyl hydrazone according to claim 1.

3. The compound 2,6-dichlorobenzaldehyde benzene sulfonyl hydrazone according to claim 1.

4. The compound 2,6-dichlorobenzaldehyde 4-methylbenzene sulfonyl hydrazone according to claim 1.

5. The compound 2,6-dichlorobenzaldehyde 4-nitrobenzene sulfonyl hydrazone according to claim 1.

6. The compound 2,6-dichlorobenzaldehyde 4-methoxybenzene sulfonyl hydrazone according to claim 1.

7. The compound 2,6-dichlorobenzaldehyde 2,5-dichlorobenzene sulfonyl hydrazone according to claim 1.

* * * * *